A. F. MASURY AND A. H. LEIPERT.
CUSHION CONNECTION FOR VEHICLE CONSTRUCTION.
APPLICATION FILED MAY 27, 1920.

1,404,876.

Patented Jan. 31, 1922.

WITNESS

INVENTORS
Alfred F. Masury
August H. Leipert
BY
Redding & Greeley
ATTORNEYS

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

1,404,876.      Specification of Letters Patent.      Patented Jan. 31, 1922.

Application filed May 27, 1920. Serial No. 384,605.

*To all whom it may concern:*

Be it known that we, ALFRED F. MASURY and AUGUST H. LEIPERT, citizens of the United States, and residing, respectively, in the borough of Manhattan and in the borough of Queens of the city of New York, in the State of New York, have jointly invented certain new and useful Improvements in Cushion Connections for Vehicle Construction, of which the following is a specification, reference being had to the accompanying drawing forming a part hereof.

In the auto-motive art to date it is the practise to make all connections between moving elements of a mechanical character and usually, as metal to metal. Spring shackles, universal joints and clevices usually involve the connection of metal to metal with the resulting wear, breakage, cost, problems of lubrication and noise. In some places it is proposed to lubricate these connections so as to minimize the wear and eliminate noise so far as possible. The principal object of the present invention is to eliminate such metallic connections in automobile structure and to provide in place thereof a form of cushion non-metallic connection which will be sufficiently strong mechanically to bear the stresses and yet which will not require lubrication and will not be subject to the frictional wear and breakage of metallic parts. Further, the improved connection will be of such character as to eliminate such noise as results from metal connections. A further object is to provide a connection of the character described which shall be less expensive than mechanical connections both in initial cost and in upkeep. The embodiment illustrated herein shows the application of the invention to one type of connection employed in automobiles between springs and frame. The illustrated embodiment also shows the use of a relatively stiff fabricated block, the base of which may be of rubber or other resilient material which may be impregnated with cords or the like to form essentially a fabricated structure which, while yielding, possesses strength and durability.

Referring to the drawings—

Figure 1:
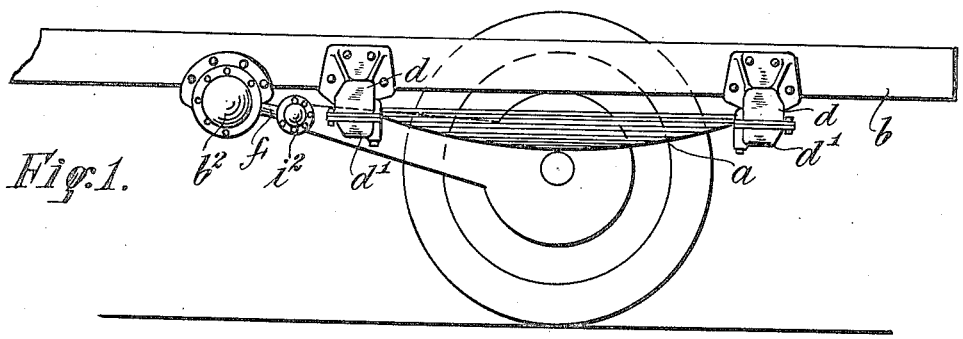
Figure 1 is a diagrammatic view of so much of the wheel and frame of an automobile as is necessary for an understanding of the application of the improved cushion connection thereto.
Figure 3:
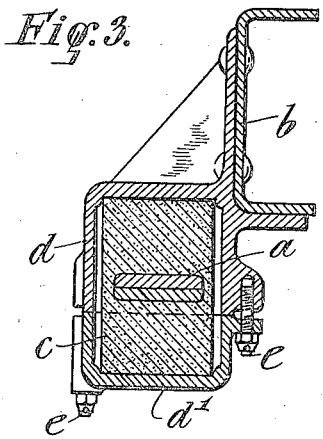
Figure 3 is a view in transverse section taken through the parts shown in Figure 2 along the plane indicated by the line 3—3 and looking in the direction of the arrows.
Figure 2:
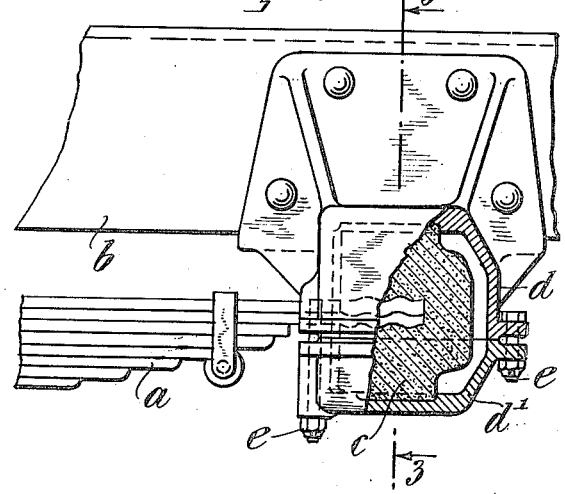
Figure 2 is a fragmentary view in detail showing the interposition of the yielding connection between the spring and side frame member.

As this description proceeds it will be evident that the invention is broader than the illustrated embodiment thereof, since the improved yielding connection will be useful at any point in an automobile where power is transmitted from one metallic unit to another. As shown in Figure 1, the vehicle spring $a$ serves as the support for the frame $b$ and it is the usual practise to interconnect these metallic parts by means of metal spring shackles. These shackles cannot be efficiently lubricated and in most instances no attempt is made to lubricate them with the result that the wear of metal on metal quickly causes the disintegration of the shackles and often results in unpleasant noise. Further, there is, of course, nothing in the nature of the shackle itself which would tend to improve the resilient character of the spring suspension. In accordance with the present invention it is proposed to overcome the disadvantages of a metallic shackle connection between vehicle springs and the frame by connecting the springs in one way or another, but through a yielding unit, to the frames. This might be done in many different ways involving forces of either compression or tension or both. As shown in Figures 2 and 3, one way of interposing such a cushion connection is by clamping a fabricated block $c$ in a suitable housing $d$ carried with the side frame member $b$ and extending the spring $a$ directly into the body of said block. For convenience in assembling and disassembling the housing $d$ may be formed with a removable cap section $d'$ adapted to be secured to the housing by means of bolts $e$. When the end of the spring $a$ is engaged with the block $c$ in the manner described and illustrated it is evident that the spring $a$ is free to elongate within reasonable limits, is firmly connected to the side frame members and transmits road shocks of either compression or tension upward or downward on the body of the block *c* according to their direction. The block is constantly under compression. The block *c* is of such character as to support the frame *b* in such manner as to minimize side sway and absorb lateral stresses transmitted through the spring *a*.

In the preferred form the block *c* is made of a base of rubber in which may be molded many cords thereby making up a fabricated block of resilient properties but strong and durable. In the construction no metal is connected with metal. A cushion connection of non-metallic material is introduced between the spring and the frame. No lubrication of the connection is required. The wear is even less than that on metal to metal, the initial cost is as little as that of metal and the upkeep is less. No noise can come from such a fabricated connection.

The invention in its full scope will appear from the appended claims.

We claim as our invention—

1. A wholly non-metallic connection and support interposed between two metallic parts of a motor vehicle, one of which parts is to be connected to and supported by the other of said parts, comprising a block of non-metallic yielding material, and connecting means to secure the block positively to one of said parts and hold it against displacement with respect thereto, the other of said parts being connected to the block independent of said connecting means.

2. In combination with the spring and frame of a motor vehicle, a wholly non-metallic mechanical connection and support interposed between an end of the spring and the frame and comprising a block of non-metallic yielding material engaged with the end of the spring, and a housing for the block secured to the frame and confining the block to hold it against displacement with respect to the frame, one side of the housing being open to admit the end of the spring freely.

3. In combination with the spring and frame of a motor vehicle, a wholly non-metallic connection and support interposed between each end of the spring and the frame and comprising a block of non-metallic yielding material, and connecting means to secure the block positively to one of said first named parts of the motor vehicle and hold it against displacement with respect thereto, said block being yielding to permit elongation of the spring and the other of said parts of the motor vehicle being connected to the block independent of said connecting means.

4. A wholly non-metallic connection and support interposed between two metallic parts of a motor vehicle, one of which parts is to be connected to and supported by the other of said parts, comprising a block of non-metallic yielding material, and means on one of said parts to support and confine said block under compression at all times and hold it against displacement with respect thereto, the other of said parts being connected to the block independent of said means.

5. A wholly non-metallic mechanical connection and support interposed between the spring and frame of a motor vehicle, and comprising a block of rubber engaged with the spring, a housing secured to the frame and holding said block against displacement with respect thereto, and a cap secured to the housing and retaining said block within the housing and confining it under compression at all times, one side of the housing being open to receive the spring.

6. As an article of manufacture, a rubber block of yielding material adapted to be supported on the frame of a motor vehicle and having a recess to receive the end of a spring and adapted to be supported on the frame under compression and connect the spring with the frame.

This specification signed this 13th day of May A. D. 1920.

ALFRED F. MASURY.
AUGUST H. LEIPERT.